United States Patent [19]
Ziegler

[11] 3,925,979
[45] Dec. 16, 1975

[54] ANTI-ICING SYSTEM FOR A GAS TURBINE ENGINE

[75] Inventor: Walter Herbert Ziegler, Topsfield, Mass.

[73] Assignee: General Electric Company, Lynn, Mass.

[22] Filed: Oct. 29, 1973

[21] Appl. No.: 410,759

[52] U.S. Cl........ 60/39.07; 60/39.09 D; 244/134 R; 415/176; 415/178; 415/180
[51] Int. Cl.²...F02G 3/00; B64D 15/00; F01D 5/08; F01D 29/08
[58] Field of Search ........ 244/134 R, 134 B, 137 R; 415/111, 178, 175, 176, 177, 180, 113; 60/39.09 D, 39.09 R, 39.08, 226 R, 262, 39.07, 39.66; 285/133, 163

[56] References Cited
UNITED STATES PATENTS

| | | |
|---|---|---|
| 2,499,832 | 3/1950 | Palmatier.......................... 244/134 |
| 2,529,103 | 11/1950 | Palmatier.......................... 244/134 |
| 2,559,851 | 7/1951 | Dean................................ 244/134 |
| 2,723,093 | 11/1955 | Price et al......................... 244/137 |
| 2,951,337 | 9/1960 | Atkinson et al................... 60/39.08 |
| 3,528,241 | 9/1970 | Venable et al.................... 60/39.08 |

FOREIGN PATENTS OR APPLICATIONS

| | | | |
|---|---|---|---|
| 736,503 | 9/1955 | United Kingdom............... 60/39.66 |
| 1,210,202 | 10/1970 | United Kingdom............ 60/39.09 D |

Primary Examiner—C. J. Husar
Assistant Examiner—Thomas I. Ross
Attorney, Agent, or Firm—James W. Johnson, Jr.; Derek P. Lawrence

[57] ABSTRACT

An anti-icing system is provided for a gas turbine engine wherein the compressed and heated airflow normally bled from the engine compressor for pressurizing seals within the engine is thereafter ducted forward to a plenum contiguous with the inside surface of the forward bullet nose in order to prohibit the formation of ice thereon.

8 Claims, 2 Drawing Figures

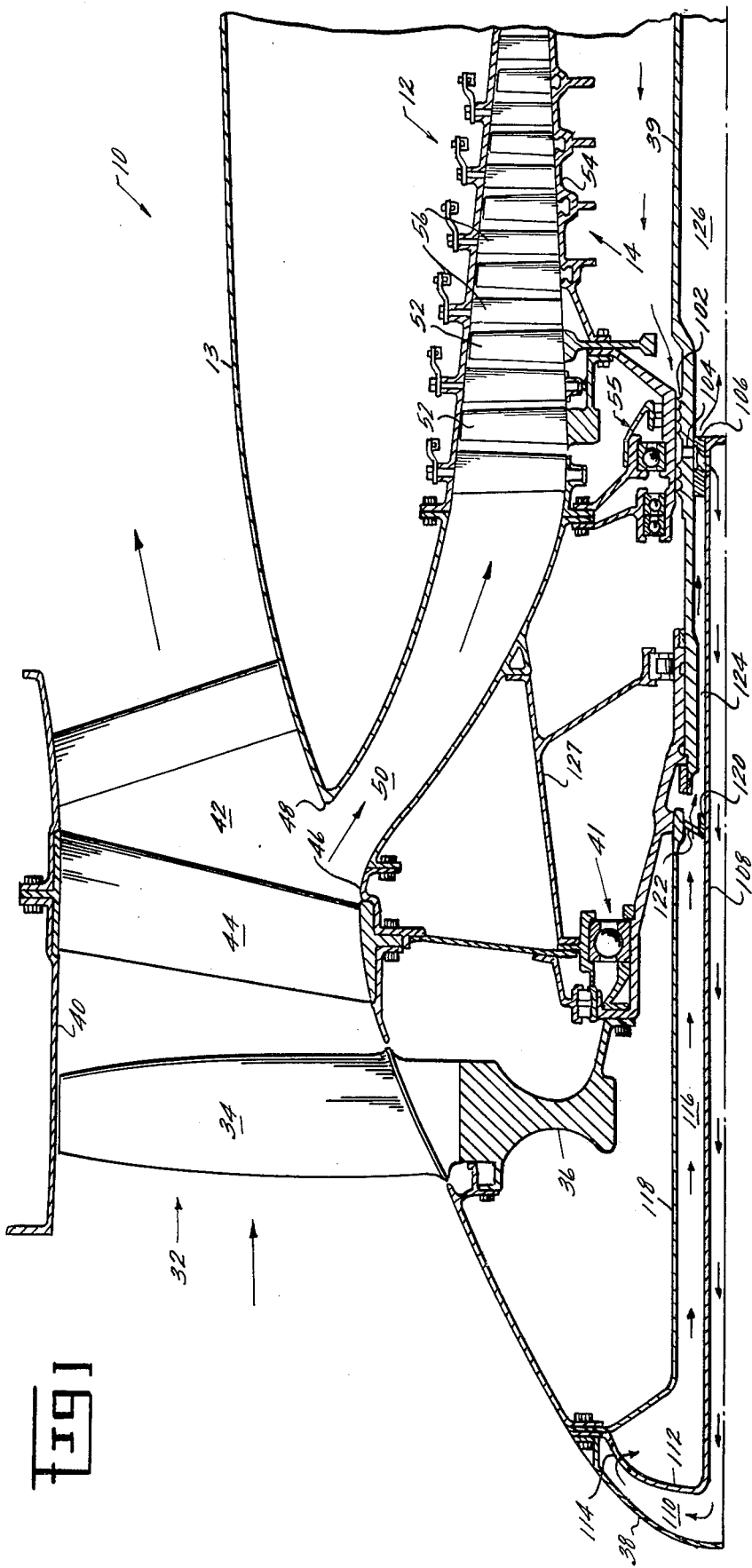

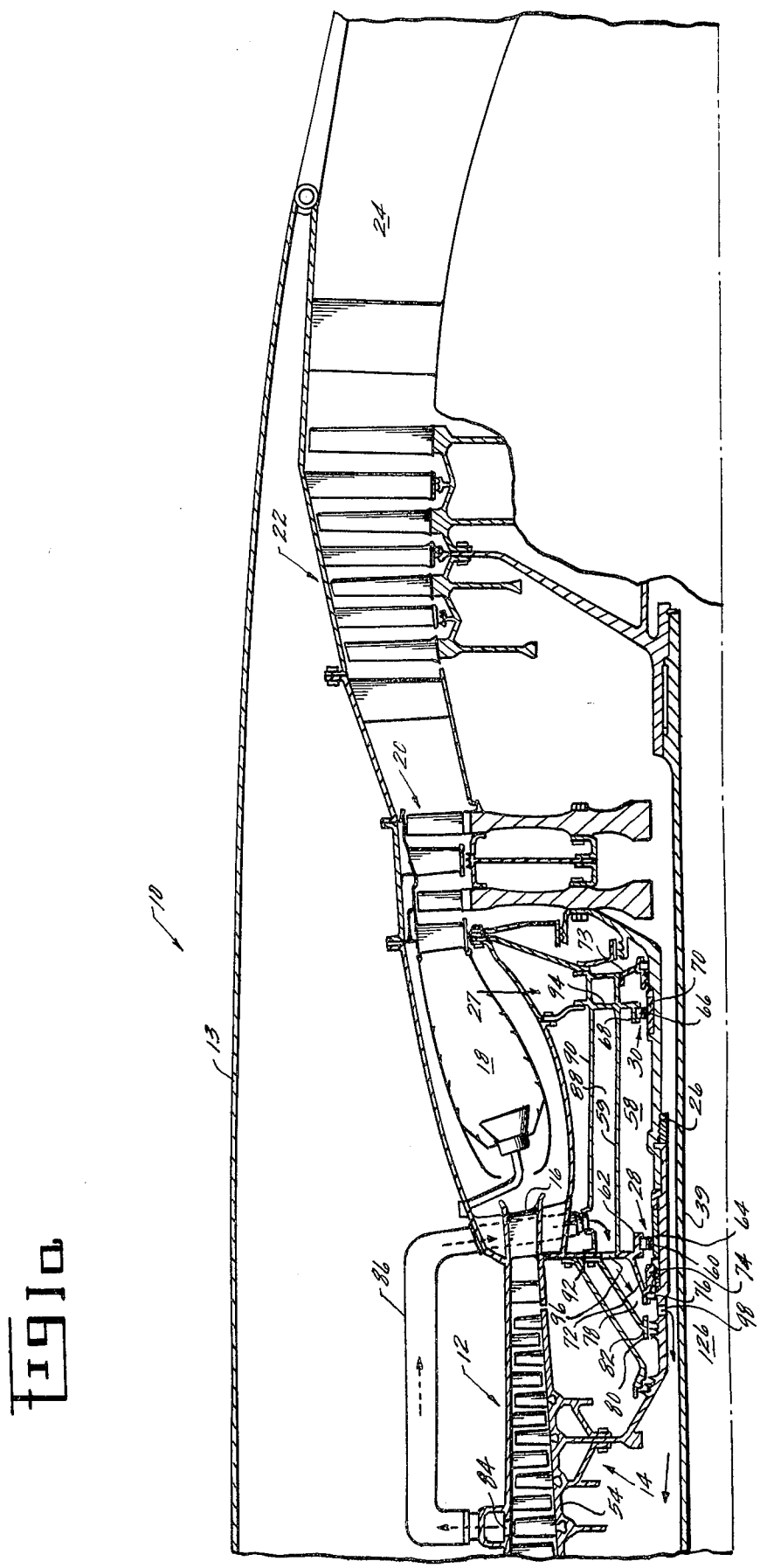

ANTI-ICING SYSTEM FOR A GAS TURBINE ENGINE

Background of the Invention

This invention relates to an anti-icing system for a gas turbine engine, and more particularly to an anti-icing system for a gas turbine engine wherein the anti-icing airflow is compressed airflow continuously bled from the engine compressor for purposes of seal pressurization.

The invention herein described was made in the course of, or under a contract or subcontract thereunder (or grant), with the Department of the Air Force.

In gas turbine engines used for powering aircraft, it is well known to provide an anti-icing system which operates to preclude the formation of ice on vital areas of the engine. One such vital area on a gas turbine engine is the bullet nose which may acquire an ice buildup in the form of a forwardly extending ice spike under certain weather conditions. If the ice spike should subsequently break off from the bullet nose and enter the inlet airstream of the engine, there is a high likelihood that the rotating blades will become damaged resulting in a decrease in engine power or possibly even a complete failure. Therefore, in order to avoid this potential danger, it is well known to provide an anti-icing airflow contiguous with the inside surface of the bullet nose as to eliminate any possibility of an ice spike forming thereon.

The anti-icing airflow is conventionally bled from the discharge end of the engine compressor in a selective manner which provides anti-icing airflow only when the weather conditions present a potential threat of icing. As will be readily appreciated, the compressed airflow which is bled from the engine compressor is at an elevated temperature relative to the ambient airflow and need not be further heated for anti-icing purposes. In order to selectively control the bleeding of anti-icing airflow from the discharge end of the engine compressor, there is ordinarily provided an anti-icing valve, the actuation of which may be controlled by a pilot from the aircraft cockpit as a function of changing weather conditions.

Inclusion of an anti-icing valve within the gas turbine engine, however, provides for additional weight and complexity which ultimately may have a degrading effect on engine performance and reliability. Also, the pilot control mission is further complicated by requiring the pilot to continuously regulate the valve as a function of changing weather conditions. In addition, each time the anti-icing valve is actuated to provide an anti-icing airflow, there is a deterioration in overall engine performance due to the increased amount of airflow bled from the compressor. However, for this reason, the anti-icing valve cannot be simply eliminated, otherwise the engine would always operate in this deteriorated state which is now assumed only during that portion of the flight mission where the anti-icing airflow is required.

Therefore, it is a primary object of this invention to provide an anti-icing system for a gas turbine engine wherein an anti-icing airflow can be continuously furnished without any degradation in the overall engine performance.

It is also an object of this invention to provide an anti-icing system for a gas turbine engine wherein the anti-icing valve may be eliminated for a simpler pilot control mission in addition to providing for an overall decrease in the weight and complexity of the engine without causing a deterioration in the overall engine performance.

It is an even further object of this invention to provide a simplified anti-icing system for a gas turbine engine wherein a portion of the airflow which is otherwise bled from the engine compressor for purposes apart from anti-icing may thereafter be utilized to provide a continuous anti-icing airflow without increasing the overall airflow bled from the compressor.

SUMMARY OF THE INVENTION

These and other objects and advantages will become clearly understood from the following detailed description and drawings, all of which are intended to be representative of, rather than in any way limiting on, the scope of invention. In a gas turbine engine having a bullet nose, a compressor, a combustor, and a turbine arranged in serial flow relation together with at least one seal continuously pressurized by compressed airflow bled from the compressor, there is also included an anti-icing system. The anti-icing system comprises a plenum contiguous with the inside surface of the bullet nose for receipt of a portion of the compressed airflow bled from the compressor after the compressor bleed airflow has been utilized for seal pressurization. Conduit means are also provided for ducting the compressed bleed airflow from the pressurized seal to the plenum and then away therefrom for discharge into the ambient airstream.

DESCRIPTION OF THE DRAWINGS

While the specification concludes with claims distinctly claiming and particularly pointing out the invention described herein, it is believed that the invention will be more readily understood by reference to the discussion below and the accompanying drawings in which:

FIGS. 1 and 1a show a cross-sectional view of a gas turbine engine embodying the anti-icing system of this invention.

DESCRIPTION OF THE PREFERRED EMBODIMENT

Referring now to the drawings, there is shown a turbofan engine 10 of the high bypass, high pressure ratio type having a core or gas generator 12 and a low pressure turbine 22 housed within an outer cylindrical casing 13. The gas generator 12 includes a compressor 14, a diffuser outlet passage 16, a combustor 18, and a high pressure turbine 20, all of which are arranged in axially spaced serial flow relationship. The downstream end of the cylindrical casing 13 terminates in an exhaust nozzle 24 which may be of the variable area type as is well known in the art. The compressor 14 and high pressure turbine 20 are interconnected by an annular shaft 26 which is journaled for rotation relative to a static frame member shown generally at 27 by a forward bearing 28 and an aft bearing 30.

A fan 32 is mounted upstream of the gas generator 12 and is driven by the low pressure turbine 22 through an interconnecting hollow fan shaft 39, the forward end of which is journaled for rotation relative to the upstream end of the static frame at 127 by a forward bearing 41. The fan 32 is comprised of a plurality of circumferentially spaced apart fan blades 34 which extend radially outward from a fan wheel 36 which is attached for rotation to the upstream end of the fan shaft 39. Upstream of the fan wheel 36 there is provided a bullet nose 38 which is fixedly connected to the fan wheel for rotation therewith. The fan blades 34 extend into an annular bypass duct 42 defined between an inner static fairing 46 and a radially spaced apart outer fan shroud or casing 40. Downstream of the fan blades 34 there are provided a plurality of circumferentially spaced apart fan outlet guide vanes 44 which extend from the inner static fairing 46 to the outer fan shroud 40.

The upstream edge of the casing 13 defines a splitter platform at 48 which in cooperation with the inner engine fairing 46 defines a compressor inlet passageway 50. The splitter platform 48 operates to divide the airflow exiting from the fan 32 such that a portion thereof enters the compressor 14 through the inlet passageway 50. Located within this passageway 50 are a plurality of axially spaced apart rows of rotatable compressor blades 52 which extend from a compressor drum 54 and which are interspaced between a plurality of axially spaced apart rows of variable stator vanes 56.

Referring now to the forward and aft bearings 28, 30, it can be seen that the bearings 28, 30 are housed within a sump 58 which is generally defined between the revolving shaft 26 and an outer cylindrical housing 59 which remains fixedly connected to the static frame member 27. The forward bearing 28 comprises an outer bearing ring or race 62 together with an inner bearing ring or race 64 between which are disposed a row of circumferentially spaced apart rollers 60. In like manner, the aft bearing 30 also comprises an outer bearing ring 68 together with an inner bearing ring 70 between which are disposed another row of circumferentially spaced apart rollers 66. The moving components of the forward and aft bearings 28, 30 receive an inlet flow of lubricant from a pressurized source which is not shown in the drawing. Lubricant delivered to the bearings must be confined within the region of the sump 58 for reasons which will be immediately apparent to those of ordinary skill in the gas turbine art. Thus the upstream and downstream ends of the sump 58 are respectively capped with a forward sump cover 72 and an aft sump cover 73. The inside edge of the forward sump cover 72 sealingly engages the rotating shaft 26 in order to prevent the leakage of lubricant therebetween. For this purpose, as is well known in the art, there is provided a labyrinth seal 74, together with a carbon seal 76, both of which are pressurized from their upstream ends in order to positively prevent the downstream leakage of lubricant.

In order to pressurize the upstream ends of the carbon and labyrinth seals, there is provided an interstage compressor bleed port 84 for continuously bleeding a portion of the compressor interstage airflow. This compressor interstage bleed airflow is thereafter ducted rearwardly through a bleed air duct 86, the downstream end of which turns radially inward, crossing the diffuser outlet passage 16 and emptying into an annular plenum 88 surrounding the sump 58. The annular plenum 88 is generally defined between the inner cylindrical casing 59 and an outer cylindrical casing 90 with the fore and aft ends defined respectively by annular wall members 92, 94 extending radially between the inner and outer cylindrical casings 59, 90. The forward annular wall member 92 includes a plurality of circumferentially spaced apart outlet ports 96 which communicate with an annular pressurization plenum 78 defined generally between an outer annular wall member 80 spaced forward of the sump cover 72. The inside edge of the outer annular wall member 80 also sealingly engages the rotating shaft 26 through a labyrinth seal 82.

The annular plenum 78 is charged by the incoming compressor interstage bleed airflow to a pressure which exceeds the pressure within the sump 58, thereby assuring that any leakage past the labyrinth and carbon seals 74, 76 will be in a direction into the sump. In this manner, the possibility of lubricant leaking out of the sump is positively precluded. It should be readily appreciated that other seals within the engine must also be pressurized in like manner and that the seal pressurization system herein described is conventional and well known to those of ordinary skill in the art. In the conventional seal pressurization system, the outlet flow of compressor interstage bleed airflow from the annular plenum 78 through outlet ports 98 may be used to pressurize other seals and then discharged overboard.

The anti-icing system of this invention, however, utilizes the same flow of pressurized air which is continuously bled from the compressor 14 at the bleed port 84. This compressor interstage bleed air is always required for seal pressurization and must be continuously bled regardless of whether an anti-icing system is provided for the gas turbine engine. After the compressor interstage bleed airflow is used to pressurize the appropriate seals within the gas turbine engine, it is then normally dumped overboard without further utilization, as previously discussed. Applicant, however, has discovered that after the compressor interstage bleed airflow has been used to pressurize the appropriate seals, it may then be directed to the upstream end of the engine to provide an anti-icing airflow which would otherwise have had to be specially bled from the discharge end of the compressor. In this manner, the engine anti-icing system may be considerably simplified by eliminating the anti-icing valve which is conventionally provided to regulate the bleeding of compressor discharge airflow for anti-icing purposes. Overall engine performance and efficiency may also be greatly improved because no additional airflow is required to be bled specifically for the anti-icing system, as is normally the case.

The anti-icing system of this invention, instead of bleeding an additional portion of the airflow at the discharge end of the compressor 14, makes further use of the compressor interstage bleed airflow from the plenum 78 which would otherwise have been discharged overboard. The compressor interstage bleed airflow from the plenum 78 is ducted forward between the compressor drum 54 and the fan shaft 39 through a labyrinth seal 102 which is rotatably disposed at the upstream end of the compressor disc adjacent a forward bearing 55. The compressor interstage bleed airflow is then directed radially inward through a plurality of circumferentially spaced apart inlet ports 104 through the hollow fan shaft 39. In the conventional gas turbine engine, the compressor interstage bleed airflow would then be dumped overboard through the aft end of the hollow fan shaft 39. However, the inlet ports 104 in the gas turbine engine embodying the anti-icing system of this invention respectively communicate with a forwardly extending central conduit 108 through a plurality of circumferentially spaced apart, radially extending inlet ducts 106. The central conduit 108 then directs the compressor interstage bleed airflow to a forward plenum 110 which is located contiguous to the forward tip of the bullet nose 38. An annular wall member 112 is spaced slightly aft of the bullet nose 38 and defines the downstream limit of the plenum 110.

As will be readily appreciated by those skilled in the art, the compressor interstage bleed airflow is at an increased temperature relative to the ambient airflow, and therefore operates to warm the forward tip of the bullet nose 38 to a temperature which precludes the formation of ice thereon. Applicants have found it to be necessary to provide an anti-icing airflow adjacent the entire inside surface of the bullet nose because those ice formations which prove potentially harmful to the fan and compressor blades are generally in the form of an ice spike extending forwardly from the tip of the bullet nose. Because these ice spikes can potentially extend for some distance forward of the tip of the bullet nose 38, they pose a threat to the rotating components and particularly to the rotating fan blades 34 in the event that they should dislodge or break off from the bullet nose tip. In order to prevent the formation of these ice spikes, it is necessary only to provide an anti-icing airflow to the forward tip of the bullet nose which is the initial point of ice spike buildup.

A plurality of circumferentially spaced apart outlet ports 114 are provided about the outer radial edge of the annular wall member 112 permitting the compressor interstage bleed air to exit from the plenum 110 through an outer annular conduit 116 defined between an outer cylindrical wall member 118 spaced apart from the central conduit 108. The aft edge of the cylindrical wall member 118 connects to the fan shaft 39 at a point downstream of the forward bearing 41. A generally radially extending, annular wall member 120 provides a midspan support of the central conduit 108 and includes a plurality of circumferentially spaced apart outlet ports 122 therethrough from whence the compressor interstage bleed air discharges from the plenum 116 into a downstream annular plenum 124 which is defined between the central conduit 108 and the outer fan shaft 39. The compressor interstage bleed airflow subsequently exits from the plenum 124 through the spaces between the circumferentially spaced apart inlet ducts 106. The compressor interstage bleed airflow is then directed downstream along the hollow fan shaft 39, from whence it exits into the ambient airstream from the open-ended downstream edge of the fan shaft.

It should be readily understood that although the invention has been depicted and described in relation to a gas turbine engines such as a turboshaft or straight turbojet engine would also be suitable for inclusion of the anti-icing system of this invention. Also, it should be readily appreciated that the bullet nose 38 need not be made rotatable, but instead may be fixedly connected to the static frame member 27.

Therefore, having described the various preferred embodiments of the invention, though not exhaustive of all possible equivalents, what is desired to be secured by letters patent is claimed below.

What is claimed is:

1. In a gas turbine engine having a bullet nose, a compressor, a combustor, and at least one turbine arranged in serial flow relation together with at least one seal continuously pressurized by compressed airflow bled from the compressor and a hollow shaft driven by a turbine, there is also included an anti-icing system comprising:

a plenum contiguous with the inside surface of the bullet nose for receipt of a portion of the compressed airflow bled from the compressor after the compressor bleed airflow has been utilized for seal pressurization, first conduit means for ducting the compressed bleed airflow from the pressurized seal to the plenum, and second conduit means for ducting the compressed bleed airflow away from the plenum through the bore of the shaft and out the downstream end thereof into the ambient airstream.

2. The anti-icing system of claim 1 wherein the first conduit means a central conduit extending along the center axis of the engine, the downstream end of which is disposed to receive the compressed bleed airflow from a pressurized seal through a plurality of circumferentially spaced apart radially extending ducts and the upstream end of which communicates with the plenum for the discharge of the compressed bleed airflow therein.

3. The anti-icing system of claim 2 wherein the second conduit means includes an outer cylindrical wall member spaced radially apart from the central conduit defining an annular conduit therebetween for the receipt of compressed bleed airflow from the plenum for discharge into the ambient airstream.

4. The anti-icing system of claim 2 wherein the plenum communicates with only the upstream tip portion of the inside surface of the bullet nose and includes an annular wall member spaced downstream of the inside surface of the bullet nose to define the downstream limit of the plenum together with a plurality of circumferentially spaced apart outlet ports provided about the outer edge of the annular wall member establishing flow communication with the annular conduit.

5. In a turbofan gas turbine engine having a bullet nose, a fan, a compressor, a combustor, a high pressure turbine and a low pressure turbine connected in serial flow relation together with an annular compressor shaft interconnecting the compressor for rotation with the high pressure turbine and a hollow fan shaft interconnecting the fan for rotation with the low pressure turbine, there are also included bearings for journalling the shafts, and seals continuously pressurized by compressed airflow bled from the compressor together with an anti-icing system comprising:

a plenum contiguous with the inside surface of the bullet nose for receipt of a portion of the compressed airflow bled from the compressor after the compressor bleed airflow has been utilized for seal pressurization, and first conduit means for ducting the compressed bleed airflow from the pressurized seal to the plenum, and second conduit means for ducting the compressed bleed airflow away from the plenum through the bore of the hollow fan shaft and out the downstream end thereof into the ambient airstream.

6. The anti-icing system of claim 5 wherein compressed bleed airflow, after pressurizing a forward seal around the annular compressor shaft, is ducted upstream between an outside compressor disc and the hollow fan shaft and then ducted through the fan shaft by a plurality of circumferentially spaced apart inlet ports communicating with the downstream end of the first conduit means; said first conduit means including a central conduit spaced inwardly of the fan shaft defining an annular space therebetween and extending along the center axis of the engine such that the downstream end thereof receives the compressed bleed airflow from the fan shaft inlet ports through a plurality of circumferentially spaced apart ducts extending radially through the annular space and the upstream end thereof communicates with the plenum for the discharge of compressed bleed airflow therein.

7. The anti-icing system of claim 6 wherein the second conduit means includes an outer cylindrical wall member spaced radially apart from the central conduit defining an annular conduit therebetween for the receipt of compressed bleed airflow from the plenum whereupon the compressed bleed airflow is then directed to the annular space between the central conduit and fan shaft for discharge into the ambient airstream through the downstream end of the hollow fan shaft.

8. The anti-icing system of claim 6 wherein the plenum communicates with only the upstream tip portion of the inside surface of the bullet nose and includes an annular wall member spaced downstream of the inside surface of the bullet nose to define the downstream limit of the plenum together with a plurality of circumferentially spaced apart outlet ports about the outer edge of the annular wall member establishing flow communication with the annular conduit.

* * * * *

UNITED STATES PATENT OFFICE
CERTIFICATE OF CORRECTION

PATENT NO. : 3,925,979
DATED : December 16, 1975
INVENTOR(S) : Ziegler, Walter Herbert It is certified that error appears in the above-identified patent and that said Letters Patent are hereby corrected as shown below:

Column 6, line 13, after the word "means" insert --includes--

Column 8, line 11, after the word "ports" insert -- provided--

Signed and Sealed this twenty-third Day of March 1976

[SEAL]

Attest:

RUTH C. MASON
Attesting Officer

C. MARSHALL DANN
Commissioner of Patents and Trademarks